A. C. JOHNSON.

TRACTION ENGINE.

APPLICATION FILED OCT. 12, 1915.

Reissued June 13, 1916.

14,149.

3 SHEETS—SHEET 1.

WITNESS

Wm. G. Drew.

INVENTOR.

Alfred C. Johnson

BY

Geo. T. Booth

ATTORNEY

A. C. JOHNSON.

TRACTION ENGINE.

APPLICATION FILED OCT. 12, 1915.

Reissued June 13, 1916.

14,149.

3 SHEETS—SHEET 2.

WITNESS

Wm. F. Drew

INVENTOR.

Alfred C. Johnson

BY

Jno. F. Booth

ATTORNEY

A. C. JOHNSON.

TRACTION ENGINE.

APPLICATION FILED OCT. 12, 1915.

Reissued June 13, 1916.

14,149.

3 SHEETS—SHEET 3.

WITNESS

Wm. G. Drew.

INVENTOR.

Alfred C. Johnson

BY

Frank T. Booth.

ATTORNEY

UNITED STATES PATENT OFFICE.

ALFRED C. JOHNSON, OF WINTERS, CALIFORNIA.

TRACTION-ENGINE.

14,149. Specification of Reissued Letters Patent. Reissued June 13, 1916.

Original No. 1,153,112, dated September 7, 1915, Serial No. 851,065. Application for reissue filed October 12, 1915. Serial No. 55,592.

*To all whom it may concern:*

Be it known that I, ALFRED C. JOHNSON, a citizen of the United States, and a resident of Winters, in the county of Yolo and State of California, have made certain new and useful Improvements in Traction-Engines, of which the following is a specification.

My invention is an improvement in traction engines, and has for its object to provide an engine of the character specified, especially adapted for hauling heavy loads over bad roads, wherein the tractor carries an endless track, which is continuously laid and lifted as the engine moves forward.

Figure 1:
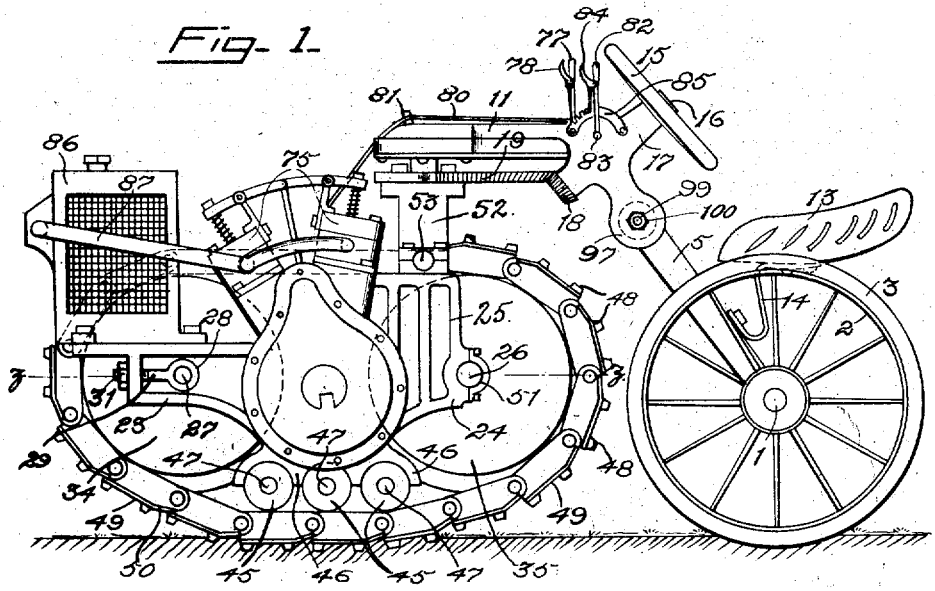
Figure 2:
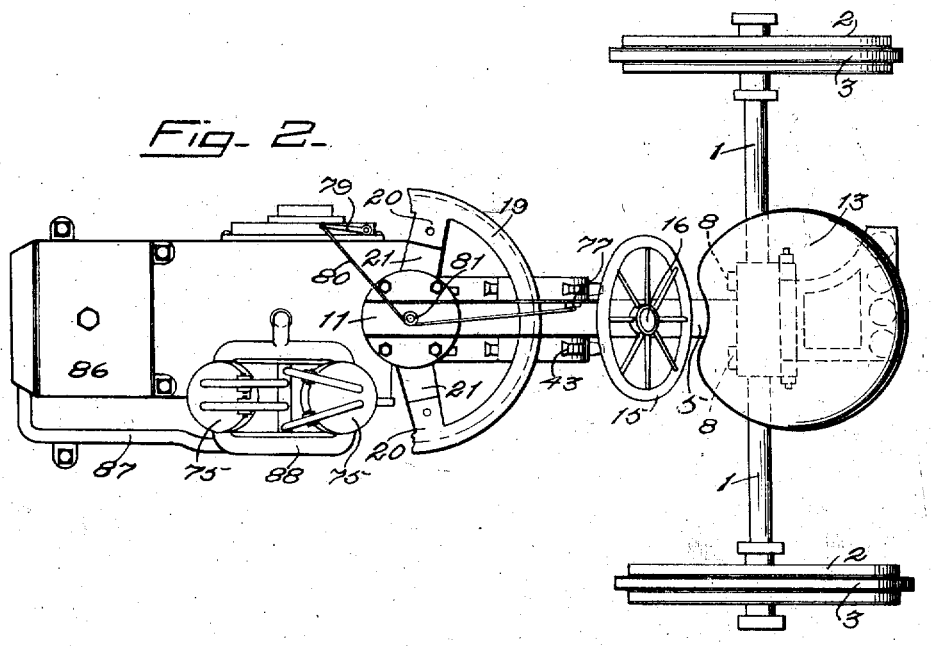
Figure 3:
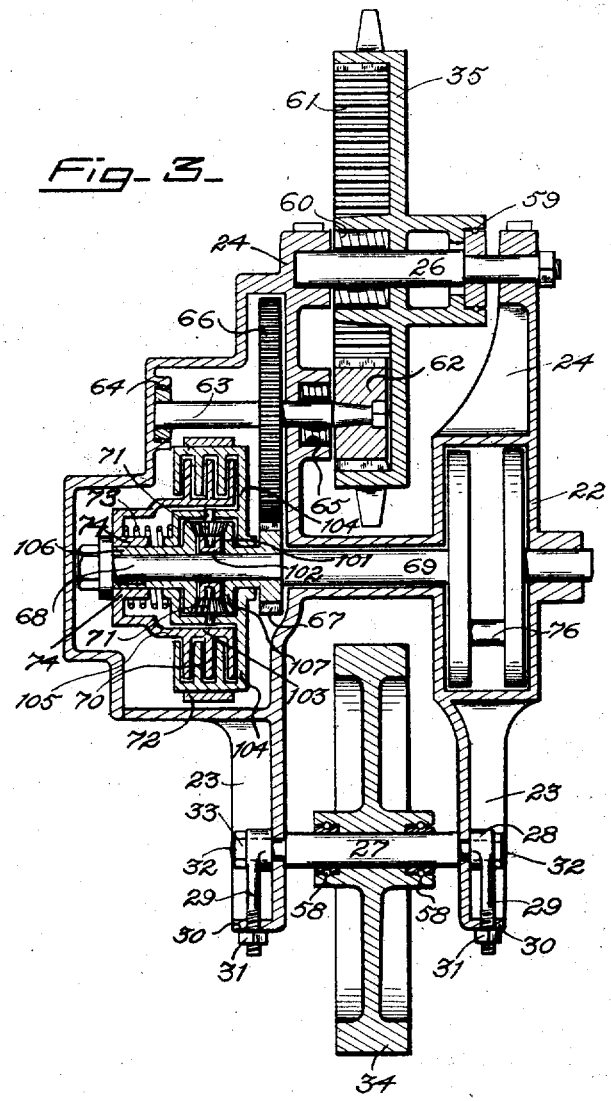
Figure 4:
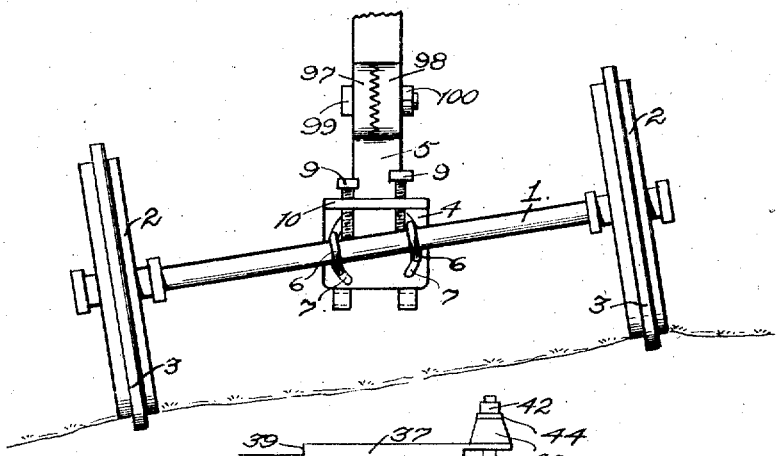
Figure 6:
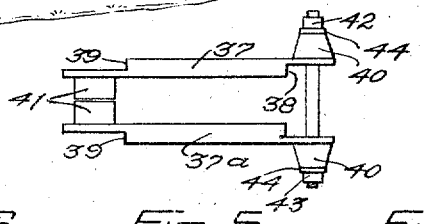
Figure 5:
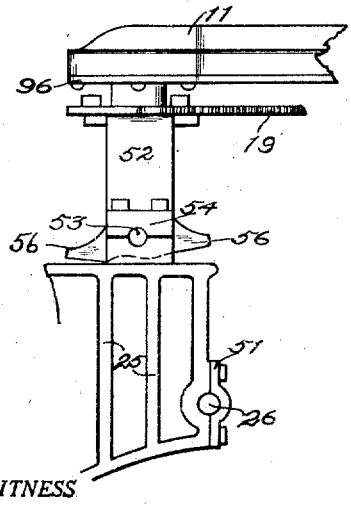
Figure 7:
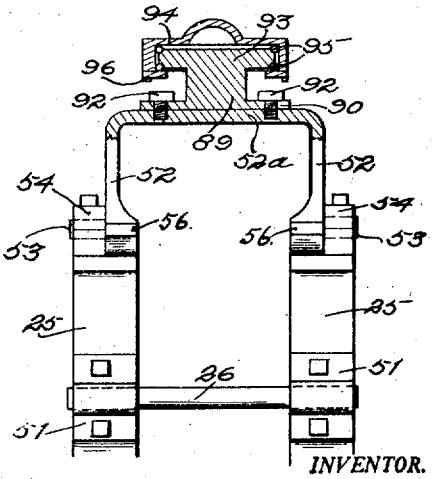

In the drawings, Figure 1 is a side view of the improved engine, Fig. 2 is a top plan view, Fig. 3 is a section on the line 3—3 of Fig. 1, Fig. 4 is a rear view of the axle showing the adjusting mechanism, Fig. 5 is a top plan view of a pair of links used in the construction of the endless track, Fig. 6 is a detail side view of a portion of the supporting frame, and Fig. 7 is a rear view of the same.

The present embodiment of the invention comprises a rear axle 1, having at each end a wheel 2, and it will be noted that the wheels have a peripheral rib 3, for engaging the ground to prevent lateral movement of the wheel. The axle 1 is held to the enlarged base 4 of a column 5, by means of substantially U-shaped clips 6. Each of the clips engages over the axle, and then passes through an arc-shaped slot 7 in the adjacent end of the enlargement 4, and the arms of each clip are engaged by nuts 8 on the opposite side of the enlargement from the axle. It will be evident that by loosening the nuts the axle may be adjusted vertically with respect to the column, or the axle may be inclined to cause either wheel to stand at a higher level than the other.

Set-screws 9 are threaded through an extension 10 from the enlargement, into engagement with the axle near the respective clips, for assisting in holding the axle in adjusted position. The column 5 inclines forwardly and upwardly to a connection with a frame 11, and the upper end of the column is adjustably connected to the frame in a manner to be presently described. A seat 13 is connected to the column, by means of a plate 14, one end of the plate being secured to the seat, and the other end to the column, and a steering wheel 15 is secured to a steering shaft 16, which is journaled in a bearing post 17 extending upwardly and rearwardly from the frame.

A bevel pinion 18 is secured to the lower end of the shaft 16, and the pinion meshes with a toothed sector 19, which is provided with inwardly extending lugs 20 at its ends, and the lugs are secured to outwardly extending lugs 21 from the tractor supporting frame. It will be evident that by turning the wheel 15 in the proper direction, the tractor frame may be swung with respect to the main frame, to guide the engine.

The tractor frame 22 has pairs of forward and rearward extensions 23 and 24 respectively, and the rearward extensions 24 have an upwardly extending frame 25, which is pivoted to the front end of the main frame 11 in a manner to be presently described. A shaft 26 is journaled in the rearward extensions 24, and a shaft 27 is journaled in bearings 28 in the rear ends of bolts 29, whose forward ends pass through flanges 30 in the extensions 23, and are engaged by nuts 31 in front of the flanges.

The ends of the shaft 27 are reduced to pass through the bearings as indicated at 32, and a nut 33 engages each reduced end outside of the bearing. It will be evident that by turning the nuts 31 in the proper direction, the axle or shaft 27 may be moved forwardly and rearwardly. The bearings 28 move in guide-ways on the outer faces of the extensions 23.

Front and rear tractor wheels 34 and 35 respectively are secured to the shafts 27 and 26 respectively, the said wheel 35 being in fact a sprocket wheel, while the wheel 34 is plain on its peripheral surface. These wheels support an endless track, that is an endless chain consisting of pairs of similar links pivotally connected together, as shown in Fig. 5. The links 37 and 37ª of each pair are arranged in parallel spaced relation, and each link has its ends oppositely rabbeted or notched, as shown at 38 and 39, the rabbet 38 being on the inner face of the link and the rabbet 39 on the outer face.

Each rabbeted portion of each link is provided with a bearing sleeve 40 and 41 respectively, the sleeves 40 at the rabbets 38 being on the outer faces of the links while the sleeves 41 at the rabbets 39 are on the inner faces. The arrangement is such that at one end, the bearing sleeves 41 extend inwardly and at the other end the sleeves 40 extend outwardly. Each pair of links is thus so arranged that they may be engaged outside of the end of the succeeding pair of links, there being sufficient space at the rabbeted surfaces 38 to receive the opposite ends of the other links.

A bolt 42 is passed through the bearing sleeves 40 and 41 at the meeting ends of each pair of links and each bolt is engaged by a nut 43 at the opposite end from the head. Washers 44 are arranged between the head of the bolt and the nut, and in the completed chain the links engage opposite sides of the sprocket teeth on the wheel 35. The chain is of such length that it will pass over the wheels 34 and 35 and over a series of truck wheels 45 journaled in a truck housing 46 on the main frame.

Each of the wheels 45 has a stub shaft 47 which is journaled in the housing and the peripheral surfaces of the wheels engage the upper edges of the links on the lower run of the chain. The said upper edges are plain, while the lower edges of the links have spurs or lugs 48 for engaging the surface over which the engine moves to prevent slipping of the chain. The lower outer edge of each link is also flanged, as indicated at 49, and the rear end of each of the outer edges is beveled, so that the rear end of the flange inclines inwardly, as indicated at 50, to extend above the adjacent edge of the flange 49 of the preceding link. The shaft 26 is journaled in sectional bearings 51 on the frames 25 and the said frames extend upwardly as shown, to a connection with arms 52 of a yoke 52[a]. The arms 52 curve outwardly and downward, and each is provided with an outwardly extending journal pin 53 which is received in a sectional bearing 54 on the adjacent frame 25.

Each of the arms 52 has a shoe 56 at the inner side of the journal pin 53, and each shoe is adapted to rest on the upper flat plane surface of the adjacent frame 25. It will be noted from an inspection of Fig. 3 that the wheel 34 is journaled on the shaft or axle 27 and that ball bearings 58 are interposed between the wheel and the shaft or axle.

The wheel 35 is journaled on the axle 26, and a ball bearing 59 and a roller bearing 60 are arranged between the wheel and the shaft or axle. The wheel 35 has an internal gear 61, which meshes with a pinion 62 on a shaft 63 journaled in the tractor supporting frame 22, and supported by a ball bearing 64 and a roller bearing 65. A gear wheel 66 is secured to the countershaft; and the gear wheel meshes with a pinion 67 journaled on the reduced end 68 of the crank shaft 69 of the engine.

The pinion 67 is rigid with the bevel gear wheel 101 of a differential consisting of the said bevel gear 101, a collar 102 on the portion 68 of the crank shaft, and pinions 71, which mesh with the bevel gear 101. The bevel gear 101 and the pinion 67 while rigid with each other are free to rotate with respect to the reduced portion 68 of the crank shaft. The pinions 71 are radial to the crank shaft, being supported by stub shafts which are journaled at their inner ends in the collar 102 and at their outer ends in a supporting web 103 rigid with the outer member 104 of a multiple disk clutch. The inner member 105 of the clutch is supported by the reduced portion 68 of the crank shaft, and by the hub of the bevel gear 101 and the members 104 and 105 of the multiple disk clutch are normally pressed toward each other by a coil spring 73. A sleeve 106 is journaled on the outer end of the portion 68 of the crank shaft, and the inner end of the sleeve is provided with a bevel gear which meshes with the pinions 71 opposite the bevel gear 101.

The spring 73 is supported by a tubular extension 74 from the member 105 of the multiple disk clutch, and by an outward extension or rib 107 on the member 104 of the said clutch. A brake band 72 encircles the outer member 104 of the multiple disk clutch, and by means of this band or ring the multiple disk clutch may be held from rotation. The operation of the above described mechanism is as follows:—

When the engine is in the forward motion the multiple disk clutch locks the differential, so that all the parts thereof including the elements 104 and 105 of the clutch and the elements 101, 102, 103, 106, 107, and 71 rotate together, all of the elements above mentioned turning with the crank shaft 69. When the brake band 72 is tightened on the element 104 of the multiple disk clutch, this element is held and the sleeve 106 which is keyed to the portion 68 of the crank shaft rotates forwardly with the engine shaft. Thus the bevel gear 101 is driven rearwardly turning the pinion 67 in the opposite direction to which it was turned when the engine was in the forward motion.

The pistons, not shown, on the two-cylinder engine indicated generally at 75 are connected to the crank 76 of the crank shaft in the usual manner and the brake band 72 is operated by means of a lever 77 provided with the usual latch mechanism 78 for cooperating with a toothed sector, not shown, to hold the lever in adjusted position. The lever is connected to the operating arm 79 of the band by means of a flexible member 80, and the said member passes over a pulley 81 journaled on the main frame 11. A second lever 82 is pivoted on the main frame, as indicated at 83, and the lever has the usual latch mechanism 84 coöperating with a toothed sector 85 on the frame, to hold the lever in adjusted position. The lever 82 controls the engine in the usual manner.

A radiator 86 is mounted at the front of the frame, and is connected to the water jacket of the engine by a pipe 87 having branches 88. The pivotal connection between the main frame and the tractor frame is shown in Figs. 6 and 7. The extensions 52 have the lower member 89 of a fifth wheel secured thereto, the said lower member having a flange 90 at its lower end which is secured to the body 52[a] of the yoke by means of machine bolts 92. The upper end of the member 89 has an annular rib 93, which is received in a socket or cylindrical recess 94 in the front end of the main frame 11.

Ball bearings 95 are arranged between the rib and the side walls of the socket, and holding plates 96 are secured to the under edges of the socket, the said plates extending beneath the rib, to hold the lower member of the fifth wheel in the socket. It will be evident that when the steering wheel 15 is turned, the toothed sector 19 will be oscillated, to swing the tractor frame with respect to the main frame, whereby to guide the engine. The tractor frame is also mounted to rock with respect to the main frame. The shoes 56 before mentioned limit the rocking movement, the said movement being on the journal pins 53. The angle of the column 5 with respect to the main frame may be changed. Both the column and the main frame having opposing heads 97 and 98 respectively, and the inner faces of the head are toothed or corrugated radially, as shown more particularly in Fig. 4. The teeth intergage to hold the parts in adjusted position. A bolt 99 is passed through central openings in the heads and is engaged by a nut 100 to hold the parts in adjusted position. It will be evident that by loosening the nut the heads 97 and 98 may be adjusted with respect to each other, and may be held in adjusted position by tightening the nut.

In operation, when the engine is running, the wheel 35 is driven forwardly or in the reverse direction, in accordance with conditions, and the said wheel drives the endless track comprising the chain above described forwardly and lays it in advance of the truck wheels 45, and the said wheels which support the machine move on the upper edges of the links 37 and 37[a]. The frame may be guided by turning the wheel 15 as above mentioned. The hinge connection at 53 permits the tractor frame to adjust itself to inequalities of the ground. The connection is a horizontal connection and the front end of the tractor frame may swing in either direction.

I claim:—

1. A traction engine comprising a wheel supported main-frame; a tractor-frame pivotally connected with the main-frame; an endless tractor track carried by said tractor-frame; means for turning the tractor-frame about its pivotal connection, to guide the engine; and a motor to drive the tractor-track.

2. A traction engine comprising a wheel-supported main-frame; a tractor-frame pivotally connected with the main-frame; an endless tractor-track; a sprocket wheel carried by the tractor-frame and engaging the tractor-track to drive it; means carried by the tractor-frame and co-acting with the sprocket-wheel to support and guide said tractor-track in its course; means for turning the tractor frame about its pivotal connection to guide the engine; and a motor to operate the track driving sprocket wheel.

3. A traction engine comprising a wheel-supported main-frame; a tractor-frame pivotally connected with the main-frame; an endless tractor-track; a sprocket wheel carried by the tractor-frame and engaging the tractor-track to drive it; means carried by the tractor-frame and co-acting with the sprocket-wheel to support and guide said tractor-track in its course; supporting truck wheels journaled on the tractor frame and engaging the tractor-track; means for turning the tractor-frame about its pivotal connection to guide the engine; and a motor to operate the track driving sprocket wheel.

4. A traction engine comprising a rear axle; a column connected with the axle; a main-frame adjustably connected with the column; a tractor-frame pivotally connected with the main frame; a tractor carried by the tractor-frame; means for turning the tractor-frame to guide the engine; and a motor to drive the tractor.

5. A traction engine comprising a wheel supported main-frame; a tractor-frame pivotally connected with the main-frame; a tractor carried by said tractor-frame; means for turning the tractor-frame about its pivotal connection, to guide the engine; a hinge joint in the tractor frame to permit said frame to rock to adjust itself to inequalities of the ground; and a motor to drive the tractor.

6. A traction engine comprising a wheel supported main-frame; a tractor-frame pivotally connected with the main-frame; a tractor carried by said tractor-frame; means for turning the tractor-frame about its pivotal connection, to guide the engine; a hinge joint in the tractor frame to permit said frame to rock to adjust itself to inequalities of the ground; means for limiting the movement of said hinge connection; and a motor to drive the tractor.

7. A traction engine comprising a wheel-supported main-frame; a tractor-frame pivotally connected with the main-frame; an endless tractor-track; a sprocket-wheel carried by the tractor-frame and engaging the tractor-track to drive it; means carried by the tractor-frame and coacting with the sprocket-wheel to support and guide said tractor-track in its course; means for turning the tractor-frame about its pivotal connection to guide the engine; a hinge-joint in the tractor-frame to permit said frame to rock to adjust itself to inequalities of the ground; and a motor to operate the track driving sprocket-wheel.

8. A traction engine comprising a rear axle, wheels journaled on the axle, a column connected with the center of the axle, the axle being adjustable with respect to the column to vary the inclination thereof, said column extending upwardly and forwardly, a main frame adjustably connected with the column and extending forwardly therefrom, a tractor-frame pivoted to the front end of the main frame for turning movement on a vertical axis, means on the main frame and engaging the tractor frame for turning the same, said frame having pairs of forward and rearward extensions, an axle supported in each pair of extensions, a wheel journaled on each axle, one of the wheels being a sprocket wheel, the front axle being adjustable toward and from the rear axle, an endless chain supported by the wheels, a truck housing at the lower part of the tractor frame between the wheels, truck wheels journaled in the housing and engaging the upper edges of the links of the chain, a motor supported by the tractor frame, a crank shaft between the axles, and connected to the motor, and a reversible driving connection between the crank shaft and the sprocket tractor-wheel.

9. A traction engine comprising a rear axle, wheels journaled on the axle, a column connected to the center of the axle, the axle being adjustable with respect to the column to vary the inclination thereof, said column extending forwardly and upwardly, a main frame adjustably connected with the column, a tractor frame pivoted to the front end of the main frame for turning movement on a vertical axis, means on the main frame for engaging and turning the tractor frame, driving wheels journaled on the tractor-frame, and a motor connected with the driving wheels for driving the same, said wheels carrying an endless track, and truck wheels supporting the tractor frame and engaging the track.

10. A traction engine comprising a rear axle, wheels journaled on the axle, a column connected to the center of the axle, the axle being adjustable with respect to the column to vary the inclination thereof, said column extending forwardly and upwardly, a main frame adjustably connected with the column, a tractor-frame pivoted to the front end of the main frame for turning movement on a vertical axis, means on the main frame for engaging and turning the tractor frame, driving wheels journaled on the tractor frame, and a motor connected with the driving wheels for driving the same.

11. A traction engine comprising a rear axle, a column connected with the center of the axle, a main frame adjustably connected with the column, a tractor frame pivoted to the main frame for turning movement on a vertical axis, means on the main frame and engaging the tractor frame for turning the same to guide the engine, the connection between the column and the main frame comprising a pair of circular heads each having radial teeth on its inner face, and the heads having a registering central opening, a bolt passing through the openings, and a nut engaging the bolt.

12. A traction engine comprising a rear axle, a column connected with the center of the axle, a main frame adjustably connected with the column, a tractor frame pivoted to the main frame for turning movement on a vertical axis, and means on the main frame and engaging the tractor frame for turning the same to guide the engine.

13. A traction engine comprising a wheel supported axle, a main frame connected with the axle, a tractor frame pivoted to the main frame for turning movement on a vertical axis, means on the main frame and engaging the tractor frame for turning the same, said frame having front and rear pairs of extensions, the members of the pair being spaced apart laterally of the tractor frame, an axle held in each pair of extensions, a wheel journaled on each axle, an endless track supported by the wheels, truck wheels journaled on the tractor frame and engaging the track for supporting the same, and a motor on the tractor frame connected with one of the wheels.

14. A traction engine comprising a wheel supported axle, a main frame connected with the axle, a tractor frame pivoted to the main frame for turning movement on a vertical axis, means on the main frame and engaging the tractor frame for turning the same, front and rear tractor wheels journaled in the tractor frame and adjustable toward and from each other, an endless track supported by the wheels, a motor supported by the tractor frame and having a driving connection with one of the wheels, and truck wheels engaging the endless track and journaled on the tractor.

15. A traction engine comprising a wheel supported main frame, a tractor frame pivoted to the main frame for turning movement on a vertical axis, front and rear wheels journaled on the tractor frame, said wheels being adjustable toward and from each other, an endless track supported by the wheels, means on the frame for driving one of the wheels, and truck wheels journaled on the tractor frame and engaging the track between the wheels.

In testimony whereof I have signed my name to this specification in the presence of two subscribing witnesses.

ALFRED C. JOHNSON.

Witnesses:

J. H. McCollough, Jr.,
L. D. Hoback.